Jan. 23, 1923.
D. J. LYNCH.
DUMP BODY FOR MOTOR VEHICLES.
FILED JULY 11, 1921.
1,442,958.
2 SHEETS—SHEET 1.
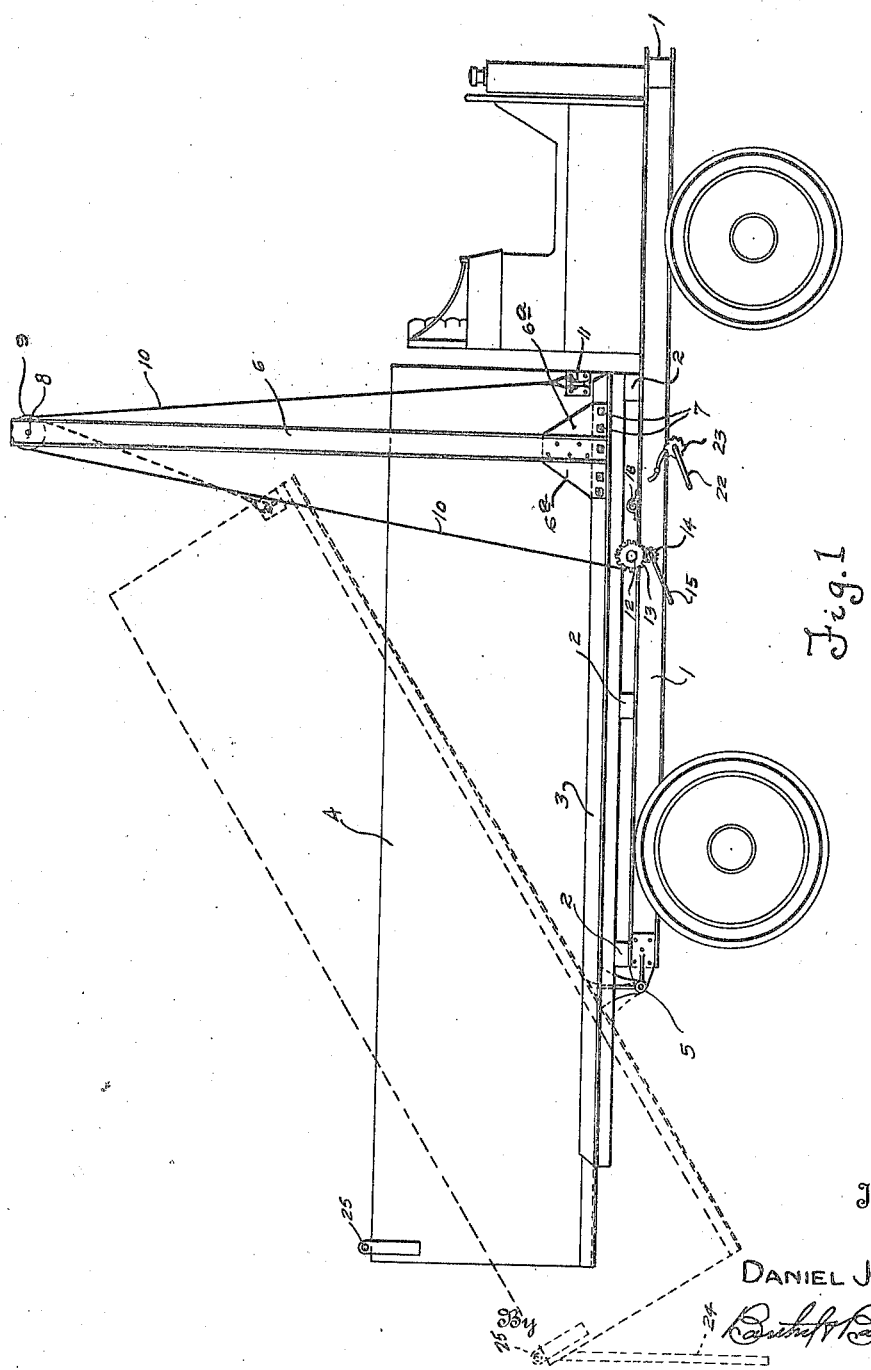
Inventor
DANIEL J. LYNCH.
By
Attorneys

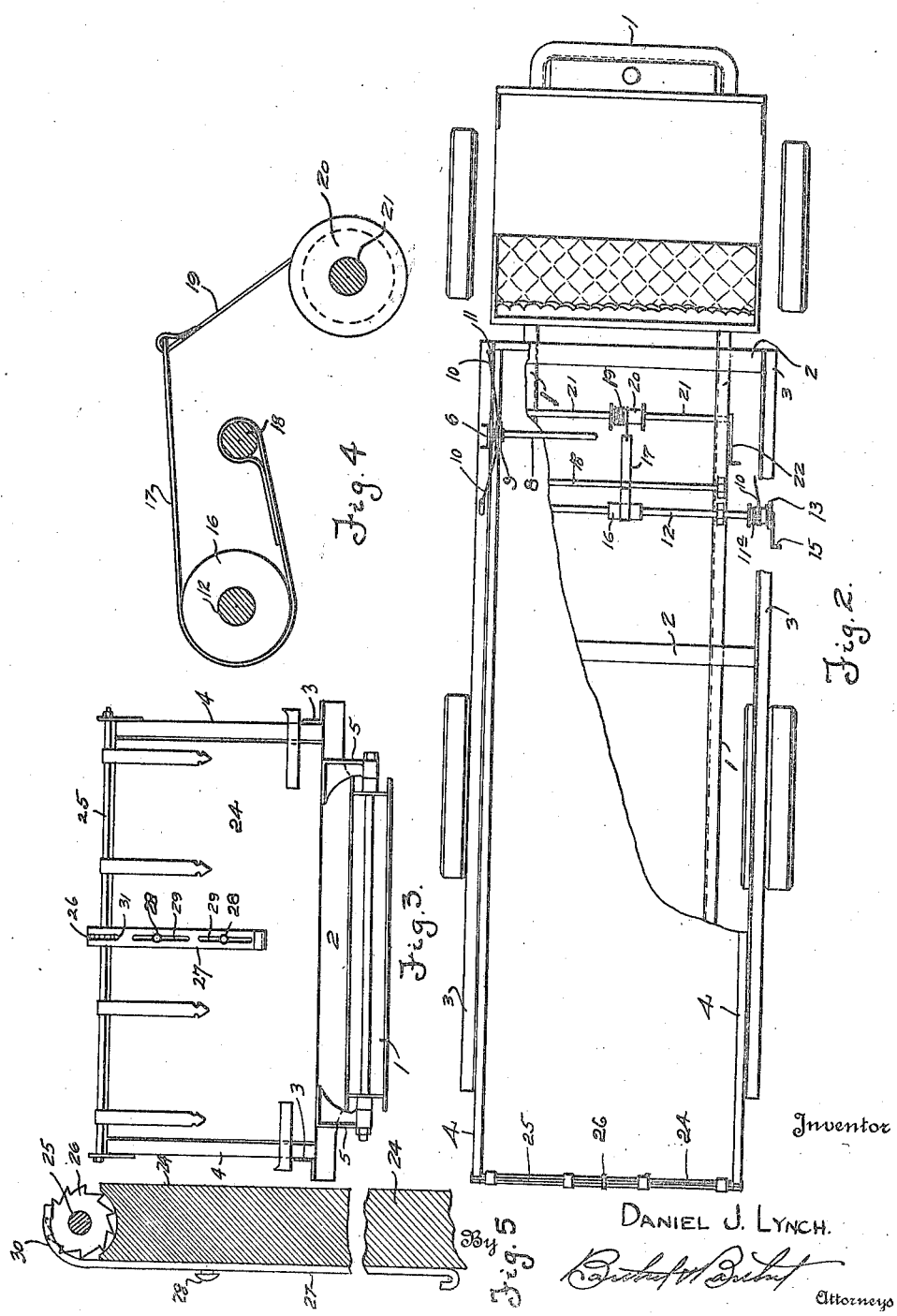

Patented Jan. 23, 1923.

1,442,958

UNITED STATES PATENT OFFICE.

DANIEL J. LYNCH, OF HIGHLAND PARK, MICHIGAN.

DUMP BODY FOR MOTOR VEHICLES.

Application filed July 11, 1921. Serial No. 483,662.

*To all whom it may concern:*

Be it known that I, DANIEL J. LYNCH, a citizen of the United States of America, residing at Highland Park, in the county of Wayne and State of Michigan, have invented certain new and useful Improvements in Dump Bodies for Motor Vehicles, of which the following is a specification, reference being had therein to the accompanying drawings.

This invention relates to vehicle bodies and more particularly to dump bodies for motor vehicles.

The object of the invention is to provide a very strong and rigid construction which is simple and cheap to manufacture and in which the body may be readily converted from a dump body into an ordinary body for holding material to be transported.

A further object of the invention is to provide simple means for elevating the front end of the dump body for the purpose of dumping, which means may be readily detached.

A further object is to provide suitable means for detachably holding a tail board in the position to which it may be turned, and further, to provide certain other new and useful features in the construction and arrangement of parts, all as hereinafter more fully described.

With the above and other ends in view the invention consists in the matters hereinafter set forth, and more particularly pointed out in the appended claims, reference being had to the accompanying drawing in which Figure 1 is a side elevation of a device embodying the invention;

Fig. 2 is a plan view of the same with parts broken away and in section to more clearly disclose the construction;

Fig. 3 is an enlarged end elevation of Fig. 2;

Fig. 4 is a detail of the brake mechanism; and

Fig. 5 is a sectional detail of an end gate locking device.

As shown in the drawing, a channel chassis frame 1 of the usual construction, supports a series of cross members 2 upon which are secured a pair of angle bars 3, one at each side of the dump body 4 which is pivotally attached to the rear end of the chassis frame by means of brackets 5 secured to the underside of the body and to the rear end of the frame 1. The body 4 is of a width to fit closely between the two angle bars 3 which thus form a guide for the body to hold it against lateral movement upon the chassis frame and to also guide it in its dumping movement, the rear ends of the two bars extending rearwardly beyond the point of pivotal connection of the body to the chassis so that as the rear end of the body tilts downwardly, it passes between the projecting rear ends of the bars 3 which thus form a guide for the body.

Power means is provided for elevating the front end of the dump body 4, said means comprising a pair of channel posts 6, one at each side of the body adjacent its forward end and firmly secured at their lower ends to the forward ends of the channel bars 3 by means of angle plates $6^a$ secured across the angles between the sides of each post and the bar 3 to which it is attached. A series of bolts 7 detachably secure the lower ends of the posts to the bars 3 and therefore, by removing these bolts, the posts may be detached and the body may then be used as an ordinary body, being held in place by the two angle bars 3.

Extending across between the upper ends of the posts 6, is a shaft 8 upon which a pair of pulleys 9 is mounted and running over these pulleys is a rope or cable 10 with one end secured to brackets 11 on the forward end of the body. The opposite end portions of the ropes or cables 10 are wound upon drums $11^a$ mounted upon the outer ends of a shaft 12 which is mounted in suitable bearings upon the chassis frame. Secured upon one end of this shaft 12 is a gear wheel 13 and a small pinion 14 is in mesh with this gear wheel and is turned by means of a hand crank 15 to wind the cable upon the drum and thus elevate the forward end of the dump body.

In order to hold the dump body in any position to which it may be elevated, a brake drum 16 is provided upon the shaft 12 intermediate its ends and directly beneath the body and engaging this drum is a flexible band 17, preferably of steel with one end of this band anchored to a fixed shaft or support 18 on the chassis frame and the opposite or free end attached to a cable 19 adapted to be wound upon a drum 20 mounted upon a transverse shaft 21 carried in bearings upon the chassis frame. One end of the shaft 21 is provided with a crank handle 22 by means of which the shaft is turned to wind the cable thereon and pull upon the free end of the band 17, thus bringing said band into frictional engagement with the pulley 16 which is mounted upon the winding shaft 12, by turning the shaft 21 by means of the crank handle and thus bringing the friction band 17 into contact with its drum, said drum and shaft 12 are prevented against rotation and thus the dump body is held in a position to which it is elevated by means of the cable 10. Retrograde rotation of the shaft 21 is prevented, or the shaft locked, by means of a pawl and ratchet or other suitable mechanism 23, the ratchet being mounted upon the outer end of the shaft and the pawl secured to the chassis frame to engage the ratchet.

The dump body is provided with an end gate 24 and this end gate is pivotally supported at its upper edge by a transverse shaft 25 upon which the gate is free to rotate, the shaft being stationary. Upon the shaft 25 is rigidly secured a ratchet 26, this ratchet being located intermediate the ends of the shaft and adjacent the vertical center of the gate. A latch bar 27 is secured upon the outer side of the gate by means of the bolts 28 passing through longitudinal slots 29 in the latch bar and the upper end of this bar is bent or curved, as at 30, to extend partially around the ratchet wheel 26, the bar being formed with a longitudinal slot 31 into which the teeth of the ratchet project. The end gate swings radially about the axis of the shaft 25 and ratchet 26 and therefore when the gate is swung outwardly away from the end of the body, it may be locked in any position to which it is adjusted by moving the latch bar 27 endwise to engage its crooked end 30 with the teeth of the ratchet, and as said ratchet is fixed upon a stationary shaft, the end gate will thus be locked in the position to which it is turned until such time as the latch bar is again moved endwise to disengage its curved end from the ratchet wheel.

A very rigid construction of dump body is provided by reason of the manner in which it is mounted upon the chassis frame and pivotally attached thereto, and this construction is cheap to manufacture and efficient in use. Further, the power means for elevating the dump body is simple in construction, and as the posts 6 thereof are detachable, they may be removed and the dump body used as an ordinary body, it being firmly held in place by the two angle bars 3 to which the posts are secured when in place.

Obviously changes may be made in the construction and arrangement of parts, within the scope of the appended claims, without departing from the spirit of the invention, and I do not, therefore, limit myself to the particular arrangement shown.

Having thus fully described my invention, what I claim is:—

1. In a dump body for motor vehicles, the combination with a chassis frame, of a body pivotally attached to the rear end of the chassis frame and extending rearwardly beyond said frame and its pivotal attachment thereto, a pair of angle guide bars upon the chassis frame, one at each side of and adjacent to the body with the rear ends of said angle bars extending rearwardly beyond the point of pivotal attachment of the body to the chassis frame, a post secured to each angle bar adjacent its forward end and the forward end of the body, and means supported by said posts for elevating the forward end of the body.

2. In a dump body for motor vehicles, the combination with a chassis frame, of a dump body pivotally attached to the rear end of said chassis frame and extending rearwardly thereof, angle bars carried by the chassis frame adjacent the sides of the body and forming guides therefor in the tilting movement of the body, posts detachably secured to said angle bars, pulleys carried by the upper ends of said posts, a cable attached at one end to the body and extending over said pulleys, and winding means on the chassis for said cables.

3. In a dump body for motor vehicles, the combination of a chassis frame, a body pivotally attached to the rear end of said frame, angle bars secured to the chassis frame at each side of the dump body, posts detachably secured to the forward ends of the angle bars, a pair of cables attached at one of their ends to the body, pulleys carried by the posts over which the cables extend, a shaft mounted transversely of the chassis frame and provided with drums upon which the cables are wound, means for rotating the shaft, and means for locking the shaft in any position to which it is turned.

4. In a dump body for motor vehicles, the combination of a chassis frame, a body, brackets on the lower side of the body and the rear end of the chassis frame, said brackets being pivotally connected to pivotally connect the body to the frame with said body extending rearwardly beyond its pivotal connection with the frame, an angle bar on the chassis frame adjacent each side of the body and extending rearwardly of the pivotal connection of the body to the frame to form guides for the body in its pivotal movement, posts secured to the forward ends of the angle bars adjacent the forward end of the body, cables secured at one end to the forward end of the body, pulleys on the posts over which the cables extend, a transverse shaft mounted in bearings on the chassis frame, drums on the shaft upon which the cables are wound, means for turning the shaft, a drum on the shaft intermediate its ends, a flexible brake band extending around the drum with one end anchored to the chassis frame, a winding shaft, a cable attached to the free end of the brake band and to the shaft to be wound thereon, means for turning the winding shaft, and means for holding the winding shaft against rotation in one direction.

In testimony whereof I affix my signature in presence of two witnesses.

DANIEL J. LYNCH.

Witnesses:
 ANNA M. DORR,
 LEWIS E. FLANDERS.